March 10, 1970     D. A. JENSEN     3,499,550
BALE ACCUMULATOR
Filed Dec. 13, 1967     2 Sheets-Sheet 2
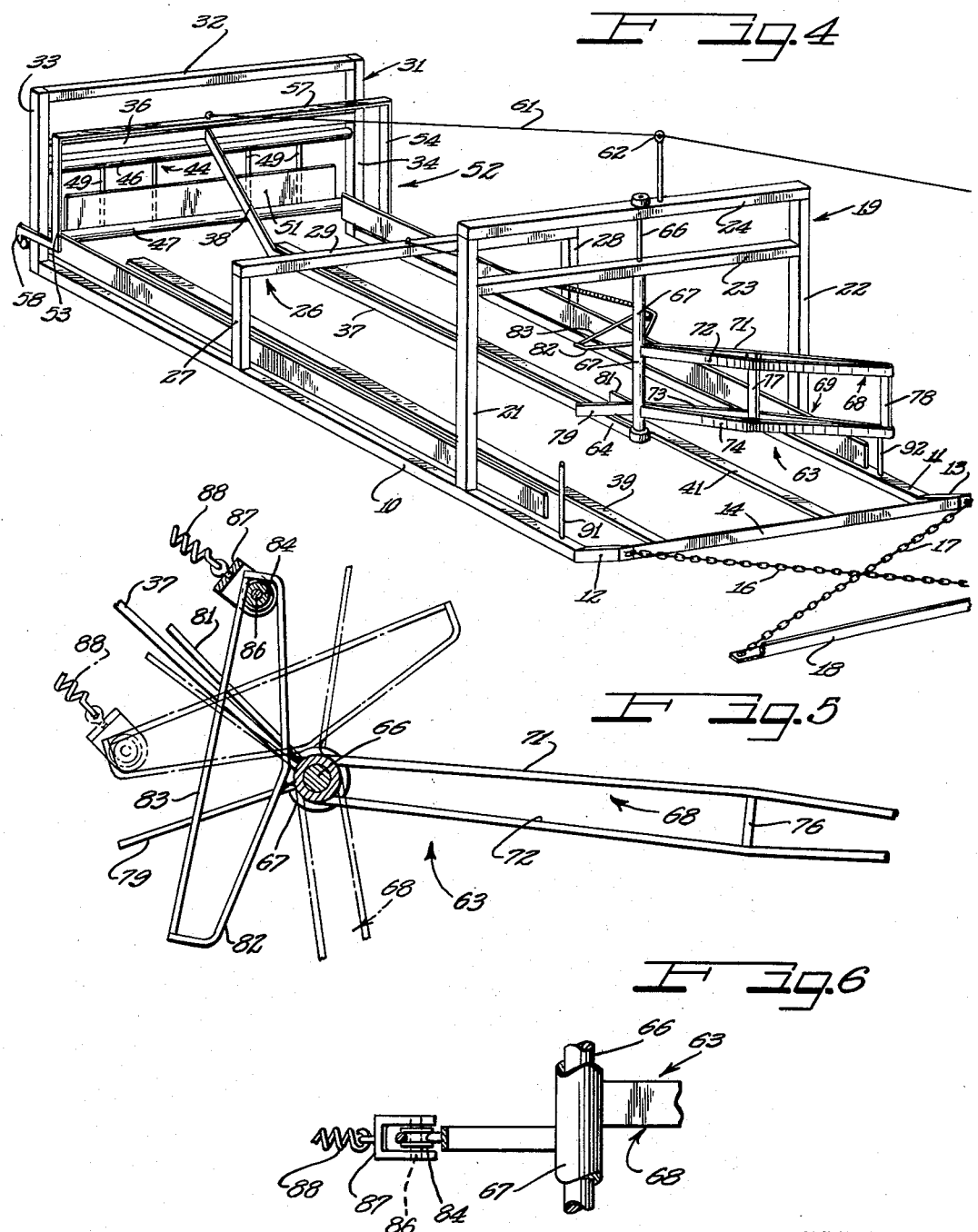
INVENTOR
*Doyne A. Jensen*
BY *Hill, Sherman, Meroni, Gross & Simpson* ATTORNEYS

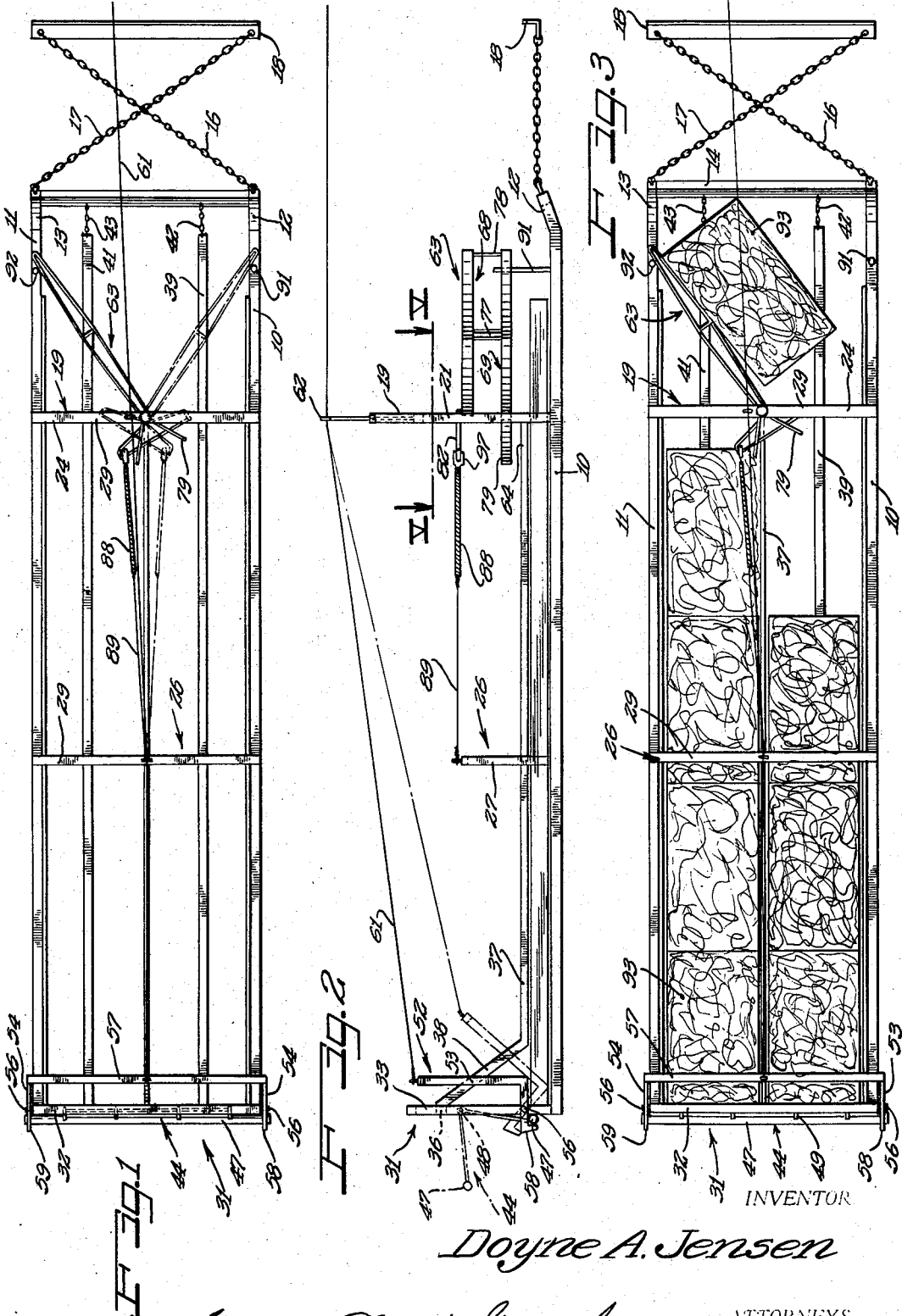

United States Patent Office 3,499,550
Patented Mar. 10, 1970

3,499,550
BALE ACCUMULATOR
Doyne A. Jensen, Frederick, S. Dak. 57441
Filed Dec. 13, 1967, Ser. No. 690,317
Int. Cl. B65g 67/00; A01d 89/00
U.S. Cl. 214—6
3 Claims

ABSTRACT OF THE DISCLOSURE

A bale accumulator for accumulating bales of hay from a baler and grouping them in neatly stacked and compressed piles in order that a hook-type fork may be utilized in picking up a group of bales in the field.

CROSS REFERENCES TO RELATED APPLICATIONS

This invention relates to a bale accumulator that may be used, for example, to group and stack bales of hay so that my hay bale loader and stacker attachment, which is the subject matter of my copending application Ser. No. 572,068 filed Aug. 12, 1966, now Patent No. 3,420,564 may be used to pick up and stack the hay.

BACKGROUND OF THE INVENTION

With the invention of hay balers it has become desirable to handle the hay in the most efficient manner. Balers eject bales in their path and a problem exists in accumulating the bales and grouping them so that they can be efficiently picked up with a hay bale loader, for example, of the type shown in my copending application Ser. No. 572,068, now Patent No. 3,420,564. Such loaders pick up eight bales at a time, for example, and before such machinery can be efficiently utilized the hay must be grouped rather than being distributed randomly about the field.

My present bale accumulator therefore, picks up randomly placed bales and stacks them in neat and efficient piles so that they can be handled by a hay loader.

SUMMARY OF THE INVENTION

A sled bale accumulator is formed with a bale director in its forward portion and adapted to alternately direct bales into first or second rows as they are engaged by the accumulator and is actuated until the accumulator has received a full load of hay. At that time an end gate mounted in the rear of the accumulator is released to allow the grouped and packed bales of hay to be ejected or discharged from the accumulator and where they will be in a neat arrangement for a hay stacker to subsequently pick up and stack them.

It is an object of the present invention therefore, to provide a new and novel bale accumulator capable of neatly stacking hay and ejecting the neat stacks behind the machine.

Other objects of this invention will become apparent to those skilled in the art upon consideration of the accompanying specification, claims, and drawing, wherein:

BRIEF DESCRIPTION OF THE DRAWING

FIGURE 1 is a top plan view of the bale accumulator;
FIGURE 2 is a side view of the invention;
FIGURE 3 is a top view of the bale accumulator;
FIGURE 4 is an isometric view of the invention;
FIGURE 5 is a top view of the trigger mechanism taken on line V—V of FIGURE 2; and
FIGURE 6 is an enlarged partial view of the trigger.

DESCRIPTION OF THE PREFERRED EMBODIMENTS

The bale accumulator of this invention comprises a pair of longitudinal sled runner frame members 10 and 11 with upturned ends 12 and 13 which are connected together by transverse front frame member 14 which extends between ends 12 and 13. Pullchains 16 and 17 are attached to ends 12 and 13 are crossed before connecting to a draw bar 18 of a baler. Crossing chains 16 and 17 stabilize the bale accumulator. The machine is pulled along the ground behind a baler to receive and group bales into compact groups of eight bales so that they can be picked up with a hook-type fork. The present invention groups the bales so that they are in a flat position and may be easily picked up by a hook-type loading fork.

A transverse trigger supporting frame member 19 has downwardly extending members 21 and 22 and cross-brace members 23 and 24. It has its lower ends attached to runners 10 and 11 adjacent the front end of the machine. The cross-brace members 23 and 24 are high enough above the ground to allow bales to pass under them.

An intermediate frame member 26 has downwardly extending sides 27 and 28 attached to members 11 and 12 and a cross member 29.

A rear transverse member 31 has a pair of cross members 32 and 36, and downwardly extending sides 33 and 34 which are attached to the rear ends of runners 11 and 12.

A center guide 37 has an upwardly extending portion 38 attached to transverse member 36 and extends down the center of the machine between runners 10 and 11 to a point below frame member 19.

A pair of thin straps 39 and 41 are attached to transverse frame member 14 by short chains 42 and 43. These straps may move and flex and aid in carrying bales over holes and rough ground.

An end gate 44 is pivotally attached to frame members 33 and 34 and comprises an upper member 46 which is pivotally attached to members 33 and 34 by a shaft 48 and a lower member 47.

Members 49 join members 46 and 47 and a flat plate 51 is attached to members 49 to complete the end gate.

An end gate lock 52 has a pair of arms 53 and 54 pivotally attached to members 33 and 34 by pins 56. A transverse member 57 joins the ends of arms 53 and 54.

The arms 53 and 54 have downwardly extending latches 58 and 59 which engage ends of lower member 47 of the tail gate.

A line 61 is attached to transverse member 57 and passes through a guide 62 mounted on transverse member 19. The line 61 is used by the operator on the machine pulling the bale accumulator to release the end gate and drop the bales.

A bale director 63 is pivotally supported between transverse member 23 and the front end 64 of strap 37. A shaft 66 is attached to members 24, 23 and end 64 of strap 37 and a hollow shaft 67 is rotatably supported by shaft 66 between member 23 and strap 64. A pair of bale director arms 68 and 69 extend outwardly from shaft 67. The arms 68 and 69 are each formed of two strips 71 and 72, and 73 and 74, respectively.

These are braced by members 76 and vertical members 77 and 78.

A pair of spring triggers 79 and 81 are attached to shaft 67 and extend into the path of bales being picked up to move the trigger.

A biasing bracket 82 is also attached to shaft 67 and has a straight portion 83 upon which a pulley 84 rides.

Pulley 84 is rotatably supported by a pin 86 in a lug 87. A spring 88 is attached to lug 87 and has its other end connected by cable 89 to transverse member 29.

A pair of bale director stops 91 and 92 are mounted on runners 10 and 11 and engage bale director 63.

In operation, the bale accumulator is pulled by chains 16 and 17 and as a bale 93 is engaged, it is directed by bale director 63 down one side of the machine. As the bale 93 passes spring trigger 79 it forces the bale director 63 from against stop 92 toward stop 91. Simultaneously, the pulley 84 rolls along portion 83 of bracket 82 until it is over center and the spring 88 pulls the bale director 63 firmly against stop 91. The bales are received flat with the strings of wire on top.

Thus, the next bale 93 will be directed down the other side of the bale accumulator. It will engage trigger spring 81 to reposition the bale director 63 against stop 92. This continues until eight bales are being pulled in the accumulator and the operator then pulls the line to release latches 58 and 59 and allow the end gate 44 to move in a horizontal position thus releasing the eight neatly grouped bales which can then be easily picked up and loaded by a hook-type fork, for example. The end gate then moves to the locked position.

The chain, spring and pulley hold the bale director in the proper position so that it moves alternately from side to side to direct alternate bales into the left or right side of the machine.

The straps 39 and 41 aid the bales in passing over holes and rough ground.

Some of the advantages of this invention are:

(1) It is economical and can be produced and sold to small ranchers and farmers.

(2) It is simple and reliable.

(3) Accumulates eight bales into a uniform group tightly compacted.

(4) Has few moving parts and repair and maintenance would be at a minimum.

(5) Accumulates the bales automatically without any electrical or hydraulic devices.

(6) Can be used with nearly all types of balers that produce rectangular bales.

(7) The machine is light in weight and can be loaded by one person into a truck or trailer for transporting. A typical machine weighs 250 pounds.

(8) It is a rectangular rigid structure and is very durable.

The cross tow chains 16 and 17 allow the accumulator to position itself under the bale chute of the baler at all times.

The principles of the invention explained in connection with the specific examples thereon will suggest many other applications and modifications of the same.

I claim:
1. A bale accumulator for grouping bales so that they may be picked up comprising, a longitudinal frame member, a releasable end gate connected to the rear end of the frame member, a latch for said end gate, means for remotely releasing said latch, a pair of side-by-side bale-receiving areas formed in the frame member and adapted to receive bales so that their wider sides engage the ground, a front transverse member attached to the frame member, a bale director pivotally connected to the longitudinal frame member adjacent its front end and movable between a pair of positions so as to alternately direct bales of material into the side-by-side bale-receiving areas, trigger means attached to the bale director to move it from one to the other position each time a bale passes the trigger means, a biasing bracket connected to the bale director having a straight portion, a pulley rotatably mounted on the straight portion, a lug rotatably supporting the pulley, a spring connected to the frame member and to the lug to hold the bale director in either of its positions, and a pair of straps connected to the transverse member and extending through the bale receiving areas to ease the passage of bales over rough ground and holes.

2. A bale accumulator according to claim 1 comprising short lengths of chains connecting said pair of thin straps to the transverse member.

3. A bale accumulator according to claim 1 including means for attaching the bale accumulator to a draw bar comprising a pair of flexible tow cables attached to the front of the longitudinal frame and to the draw bar and said flexible tow cables crossed between the draw bar and the longitudinal frame.

References Cited

UNITED STATES PATENTS

| | | | |
|---|---|---|---|
| 1,391,101 | 9/1921 | Doe | 280—480 |
| 2,736,159 | 2/1956 | Marshall | 214—353 X |
| 2,822,659 | 2/1958 | Moore. | |
| 3,080,071 | 3/1963 | Pratt et al. | |
| 3,139,196 | 6/1964 | Legocki. | |
| 3,163,303 | 12/1964 | Schlake. | |
| 3,302,807 | 2/1967 | Blair. | |
| 3,308,971 | 3/1967 | Sinden et al. | |

GERALD M. FORLENZA, Primary Examiner

R. J. SPAR, Assistant Examiner

U.S. Cl. X.R.

214—353